United States Patent
Polakowski

[11] Patent Number: 6,123,620
[45] Date of Patent: Sep. 26, 2000

[54] MULTIRATE COUPLER WITH IMPROVED VIBRATION ISOLATION CAPABILITY

[75] Inventor: Stephen E. Polakowski, Houghton, Mich.

[73] Assignee: Brunswick Corporation, Lake Forest, Ill.

[21] Appl. No.: 09/135,921

[22] Filed: Aug. 18, 1998

[51] Int. Cl.[7] ...................................................... F16D 3/52
[52] U.S. Cl. ............................ 464/73; 464/92; 464/150; 267/279
[58] Field of Search .................... 464/73, 76, 92, 464/93, 147, 150, 160; 267/154, 279

[56] References Cited

U.S. PATENT DOCUMENTS

| | | | |
|---|---|---|---|
| 2,502,790 | 4/1950 | Jencick | 464/73 |
| 3,313,125 | 4/1967 | Hein | 464/73 |
| 3,837,179 | 9/1974 | Barth . | |
| 4,037,431 | 7/1977 | Sugimoto . | |
| 4,380,442 | 4/1983 | Amsel | 464/76 X |
| 4,747,796 | 5/1988 | Iwai et al. | 464/73 X |
| 4,772,245 | 9/1988 | Readman et al. | 464/160 X |
| 5,120,032 | 6/1992 | Smith | 267/154 X |
| 5,545,089 | 8/1996 | Kirschey | 464/160 X |
| 5,720,638 | 2/1998 | Hale . | |

FOREIGN PATENT DOCUMENTS

| | | | |
|---|---|---|---|
| 1425389 | 2/1969 | Germany | 464/76 |
| 2439558 | 2/1976 | Germany . | |
| 2609008 | 9/1976 | Germany . | |
| 2742560 | 4/1979 | Germany | 267/154 |
| 52-1352 | 1/1977 | Japan | 464/73 |

*Primary Examiner*—Lynne H. Browne
*Assistant Examiner*—Greg Binda
*Attorney, Agent, or Firm*—William D. Lanyi

[57] ABSTRACT

A coupler is provided which responds to relative rotation of a driving and a driven shaft with variable rates of stiffness. As the two shafts experience slight degrees of relative rotation, such as at idle speed, the elastically deformable member of the coupler responds in a relatively soft manner with a slight degree of stiffness. As relative rotation increases because of the transmission of higher torque between the driving and driven shafts, the elastically deformable member responds with a stiffer reaction. The elastically deformable member also reacts in a similar manner with differing rates of stiffness to misalignment of the driving and driven shafts.

17 Claims, 8 Drawing Sheets

MULTIRATE COUPLER WITH IMPROVED VIBRATION ISOLATION CAPABILITY

BACKGROUND OF THE INVENTION

1. Field of the Invention

The present invention is generally related to a coupler used for connecting two shafts together in torque transmitting relation and, more particularly, to an elastomeric coupler that exhibits two or more different rates of stiffness in response to different magnitudes of torque being transmitted by one shaft to another while allowing the engine mount system to adequately isolate the vibration of a motive source, such as an internal combustion engine.

2. Description of the Prior Art

It is common and well known to use elastomeric couplers to transmit torque from one shaft to another. The advantage of using an elastic material as a coupler relates to the ability of an elastic coupler to reduce vibration and noise at the connection between the two shafts. As one shaft rotates with a slightly different speed characteristic than the other shaft, the two shafts can exhibit slight degrees of rotation relative to each other. The elastic material is able to compress to accommodate this relative movement. Another advantage of using elastic couplers is that slight degrees of misalignment can be accommodated by the deformation of the coupler.

U.S. Pat. No. 3,837,179, which issued to Barth on Sep. 24, 1974, describes a flexible coupling in which the jaws of one flange are normally interdigitated with the jaws of the other flange to form substantially cylindrical chambers for reception of elastically deformable cylindrical inserts which transmit torque between the flanges when one flange rotates to drive the other flange. At least one of the flanges has a hub and a rim which is separably connected to the hub by screws and can be moved, upon removal of screws, with the respective jaws in a direction away from the jaws of the other flange to thus permit convenient withdrawal of the inserts. The inserts are connected to a split ring which can pass over the hub when the latter is separated from the rim.

U.S. Pat. No. 4,037,431, which issued to Sugimoto on Jul. 26, 1977, describes a coupling device that is used in a one way rotating drive. The coupling device is used for transmitting rotation torque in only one direction from the drive member to a driven member and has first and second flange members and an elastic circular compression member. The compression member has projections on the periphery which are grabbed by claws on the flange members. There are several pairs of claws, one claw of each pair being attached to the first flange and the other claw being attached to the second flange. The first and second flanges are connected to the drive and driven members, respectively. As the drive members rotates in its only rotating direction, torque is transmitted between the paired claws via the elastic projections between the paired claws. The elastic member also has smaller projections which extend between the claws of adjacent pairs and are therefore free of compression during rotation.

German patent 2439558 which issued to Schonenberg, discloses a flexible coupling for rotating shafts. The flexible coupling has two similar halves with claws that interlock. It also has a shaped elastic damping ring. The shaft coupler consists of two similar halves with claws in a circular pattern that keep the two mating faces at a prescribed clearance from one another. An elastic damping ring fits in the clearance space. The advantage claim for the design is that the damping ring is small, compact, of low weight and low cost of manufacture. There is a common inner ring for the two coupling halves with the elastic element held in the region of the claws by two cams. The elastic element is shaped in both axially directions to fit into the coupling halves. The inner surfaces of the claws are flat, but are cylindrical on the outer section in the form of a reinforcing tooth. Alternatively, the elastic element can be barrel shaped with curved facing surfaces.

German Patent 2609008, which to issued to Ward, describes a flexible shaft coupling with barrel shaped pressure blocks. The flexible shaft coupling ring consists of an even number of equally spaced barrel coupling blocks. The blocks are joined by alternative axially offset connecting webs. A circular assembly of compression blocks is thus obtained. The flanged coupling sleeves which are attached to each shaft and which have an equal number of location pockets for the flexible compression elements of the coupling ring are provided. The shape of the coupling ring allows a particular compact construction of the flanged shaft sleeves. Bigger shaft diameters can therefore be coupled with a given size coupling of this type.

U.S. Pat. No. 5,720,638, which issued to Hale on Feb. 24, 1998, describes an engine driveshaft coupler for a personal watercraft. A jet propelled watercraft has a coupling assembly to couple an engine crankshaft to a jet pump impeller shaft. The coupling assembly can accommodate substantial engine crankshaft vibrations yet effectively isolates the jet pump impeller shaft from transverse movement. The coupling assembly includes an engine crankshaft coupling head, an intermediate coupler, an impeller shaft coupling head and two elastomeric islolators positioned between each of the coupling heads and the intermediate coupler. The intermediate coupler is supported exclusively by the elastomeric isolators, and is allowed to tilt transfers through the rotational axis of the intermediate coupler to accommodate engine crankshaft displacement. The coupling assembly is practical for personal watercraft because although elastomeric isolators wear or shred quickly in the presence of transverse misalignment, elastomeric isolators provide significant durability in the presence of a reasonable amount of angular displacement. The coupling assembly allows the engine to be soft mounted to the hull of the watercraft and therefore significantly reduces engine noises resonating from the watercraft hull.

In many applications where torque is transmitted from a driving shaft to a driven shaft, there are severally goals which the designer typically attempts to accomplish. For example, during the transmission of low magnitudes of torque between the driving and driven shafts, it is often desirable that an elastomeric coupler exhibit a relatively low magnitude of stiffness. This low stiffness allows the elastomeric coupler to be deformed readily to absorb vibrations which can occur during periods of low torque transmission. For example, if the driving shaft is an output shaft from an internal combustion engine, the operation of the engine at idle speed can cause the driving shaft to rotate at varying speeds which are affected by the firing sequence in the cylinders of the engine. Upon each ignition of the gaseous mixture in a cylinder, a pulse of torque is applied to the driving shaft and this is then followed by an absence of a torque pulse until the next cylinder fires. If the elastomeric coupler is too stiff, the vibrations and noise resulting from the varying speeds of the driving shaft will be transmitted through the coupler to the driven shaft. Therefore, it is desirable to have a softer coupler, with a lower magnitude of stiffness, during periods when the engine is operating at idle speed. However, when the driving shaft is transmitting relatively high magnitudes of torque to the driven shaft, it is desirable to have a relatively stiff coupler which transmits the torque from the driving to the driven shafts without being overly compressed. Typically, a soft coupler can be over compressed when high magnitudes of torque are transmitted from the driving shaft to the driven shaft. Therefore, it can be seen that two significantly different characteristics of couplers are usually desirable to accomplish the contradictory goals of having a soft coupler with a low stiffness for low speed operation and a stiffer coupler for high speed operation when higher magnitudes of torque are transmitted from the driving shaft to the driven shaft.

The stiffness of a material is generally defined as its ability to resist deformation under stress. The modulus of elasticity is the usual criterion of the stiffness of a material. The modulus of elasticity, in either tension or compression, is the constant which expresses the ratio of unit stress to unit deformation for all values of unit stress not exceeding the proportional limit of a material. This term is also sometimes referred to as the coefficient of elasticity or Young's modulus. Since the elastomeric material used to manufacture a coupler will exhibit a constant modulus of elasticity, its stiffness will typically also be constant. Therefore, the soft elastomeric material that is particularly advantageous during low speed operation will be disadvantageous during periods when high magnitudes of torque are transmitting from the driving shaft to the driven shaft. Conversely, a coupler with a high degree of stiffness which is particularly advantageous during high speed operation, when significant magnitudes of torque are being transmitted, will be disadvantageous at low speed operation when a softer coupler is desirable.

It would therefore be significantly advantageous if a coupler could be developed which exhibits different rates of stiffness at different magnitudes of torque.

SUMMARY OF THE INVENTION

The present invention provides a coupler that exhibits different rates of stiffness at different magnitudes of torque. The primary advantage of the present invention is that it allows a softer reaction at low torque magnitudes, such as during idle of an internal combustion engine, but provides a higher rate of stiffness when higher magnitudes of torque are transmitted through the coupler. The coupler of the present invention accomplishes this multirate function by providing a shaped surface of contact between an elastomeric coupler and nonelastic fingers attached to the driving and driven shafts of a coupler assembly.

A coupler shaft made in accordance with the present invention comprises a first shaft and a second shaft. A first plurality of fingers are attached for rotation with the first shaft and extend from the first shaft in a direction that is generally parallel to a first centerline of the first shaft. A second plurality of fingers are attached for rotation with the second shaft and extend from the second shaft in a direction that is generally parallel to a second centerline of the second shaft. The first plurality of fingers are interdigitated with the second plurality of fingers. The first shaft can be a driving shaft connected to an internal combustion engine, or other source of motive force, and the second shaft can be a driven shaft connected to a device that is rotated by the internal combustion engine, such as an impeller of a marine vessel.

An elastically deformable member is provided which comprises a plurality of lobes extending radially from a central hub. Each of the plurality of lobes is disposed between an associated one of the first plurality of fingers and an associated one of the second plurality of fingers. Relative motion of the first and second shafts moves a first contact surface of a predetermined one of the first plurality of fingers into compressive contact with a second contact surface from a predetermined one of the plurality of lobes. The first and second contact surfaces are shaped to cause an initial contact to occur between the first and second contact surfaces at a first region of the second contact surface in response to a first magnitude of the relative rotation of the first and second shafts. The first and second contact surfaces are also shaped to cause a subsequent contact to occur between the first and second contact surfaces at a second region of the second contact surface in response to a second magnitude of relative rotation of the first and second shafts. The resistance of the predetermined one of the plurality of lobes to the relative rotation of the first and second shafts is greater during the subsequent contact than during the initial contact.

In certain embodiments of the present invention, each of the first plurality of fingers can be attached to a first plate which is attached to the first shaft and each of the second plurality of fingers can be attached to a second plate which is attached to a second plate which is attached to the second shaft.

A distal portion of each of the plurality of lobes can be thicker in a direction parallel with the first and second centerlines than the more radially inward portions of each of the plurality of lobes. The distal portion provides a reaction to being compressed between the first and second plates with a stiffness that varies directly with a degree of misalignment between the first and second shafts. The distal portion of each of the plurality of lobes can be generally spherical to accomplish the multirate reponse to misalignment.

The second contact surface can have a protrusion extending from it in a generally circumfential direction in order to contact the first contact surface before any other portion of the second contact surface in response to the relative rotation of the first and second shafts.

The first shaft can be a drive shaft in an internal combustion engine and the second shaft can be connected for torque transmission with a propeller shaft of a marine propulsion system. The marine propulsion system can be an outboard motor or a stern drive device. In addition, the propeller can be replaced by an impeller of a jet drive marine propulsion system. The elastically deformable member can be made of a synthetic elastomer.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Throughout the description of the preferred embodiment of the present invention, like components will be identified by like reference numerals.

Figure 1:
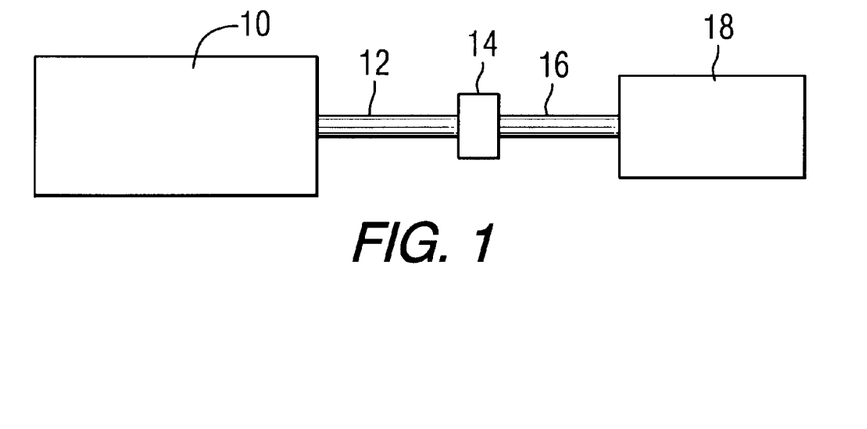
FIGS. 1 and 2 show two arrangements of a source of motive power and a driven member in which the present invention can be used.

FIG. 1 shows a highly schematic representation of a configuration in which the present invention could be used. A device for providing a motive force, such as an internal combustion engine, is identified by referenced numeral 10 in FIG. 1. The internal combustion engine rotates a driving shaft 12 which is connected, through a coupler 14, to a driven shaft 16. The driven shaft can be connected to a device 18 that is ultimately driven by the internal combustion engine. This device 18 can be an impeller of a jet propelled marine vessel, but it should also be clearly understood that any other device which is driven by a source of motive force 10 can be coupled through a coupler 14. The function of the coupler 14 is to transmit torque, reduce vibration and noise, and allow for a predetermined degree of misalignment between the driving shaft 12 and the driven shaft 16. In addition, it performs the function of decoupling the engine 10 from the propulsion system.

Figure 2:
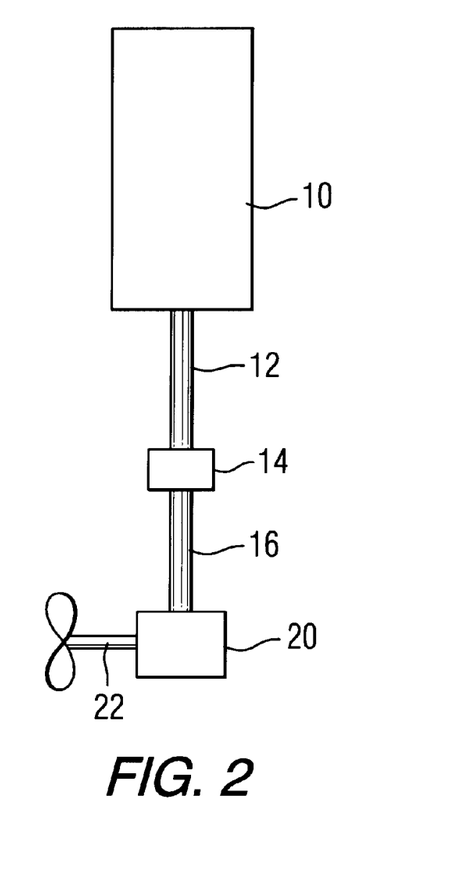

FIG. 2 shows a slightly different configuration in which the present invention can be used. A source of motive force 10, such as an internal combustion engine, rotates a driving shaft 12 which, through coupler 14, rotates a driven shaft 16. In the case of an outboard motor, such as schematically represented in FIG. 2, the driven shaft 16 causes rotation of a gear set 20 which, in turn, rotates a propeller shaft 22. Similarly to the system shown in FIG. 1, the coupler 14 in FIG. 2 serves the purpose of transmitting torque, reducing vibration and noise, and allowing for a predetermined degree of misalignment between the driving shaft 12 and the driven shaft 16. It also decouples the engine 10 from the device 18 and the gear set 20.

Figure 3A:
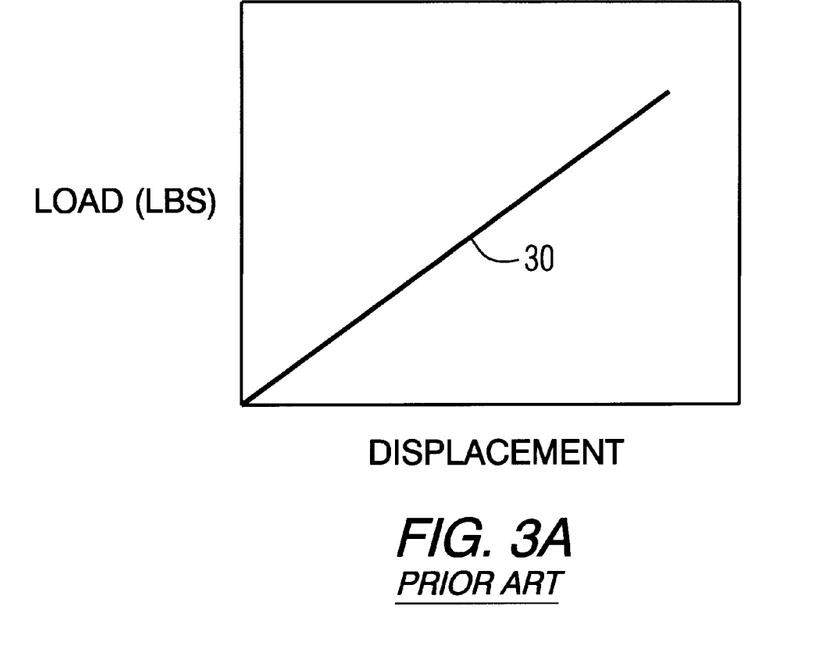
FIG. 3A is a graphical representation of a single rate of stiffness provided by known couplers.
Figure 3B:
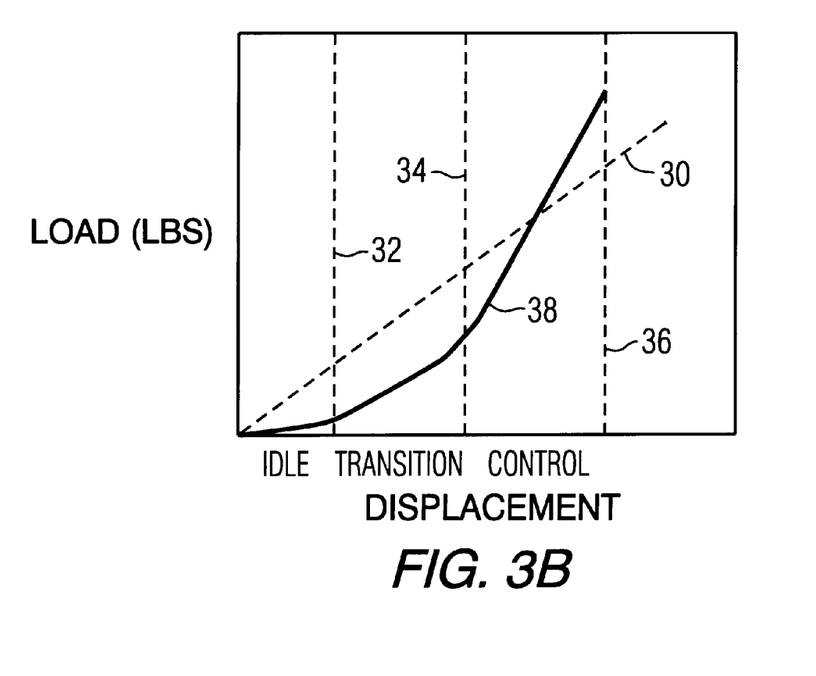
FIG. 3B is a graphical representation showing the multiple rates of stiffness provided by the present invention.

FIGS. 3A and 3B show the difference in the way that a coupler made in accordance with the present invention and a coupler made in accordance with the prior art react to a load transmitted through the coupler. FIG. 3A shows the relationship between the displacement exhibited by the coupler and the torque transmitted through the coupler. In an embodiment of the present invention such as that described above, which relates to a rotating shaft driven by a motive force, the displacement is the relative rotation between the driving shaft 12 and the driven shaft 16. This displacement results from compression of portions of the elastomeric coupler. The load represented as the vertical axis in FIG. 3A can be measured in pounds of force or, when the coupler is used in the manner described above, is equivalent to the torque transmitted through the coupler. The straight line 30 in FIG. 3A represents the fact that the rate of the load is constant in its relationship to the displacement. The slope of line 30 is generally equivalent to the rate or stiffness exhibited by the coupler. However, as known by those skilled in the art, the stiffness characteristic of rubber is not precisely linear.

FIG. 3B represents the load as a function of displacement for a coupler made in accordance with the present invention. For purposes of reference, line 30 of FIG. 3A is represented in FIG. 3B as a dashed line. The relationship between load and displacement in FIG. 3B is divided into three regions. When the internal combustion engine is at idle speed, a relatively slight displacement occurs and the load transferred through the coupler is also relatively small. During this slight displacement, or relative rotation of the driving and driven shafts, the coupler responds in a soft manner to isolate both sound and vibration. This slight load transfer, as a function of displacement or relative rotation, occurs as the elastomeric member begins to make initial contact with the rigid fingers of the coupler construction as will be described in greater detail below. During subsequent contact between the elastomeric coupler and the rigid fingers, the rate changes and an increased area of contact is used to absorb the load. During this transition phase the coupler acts in a manner that is less soft than the idle phase, but not with the eventual stiffness that it will exhibit during the control phase when the displacement and the load are both increased. Under high torque loads, the change in displacement, or relative rotation between the driving shaft 12 and the driven shaft 16, decreases as a function of load. During this transition phase, high magnitudes of torque or load are transmitted through the coupler without corresponding increases in displacement that would otherwise be expected if the stiffness of the coupler was the same during the control phase as the idle phase.

With continuing reference to FIG. 3B, it should be understood that the surfaces of an elastomeric coupler and a rigid plurality of fingers, as will be described in greater detail below in conjunction with FIGS. 4–9, are particularly selected to impose a changing contact area between the components as a function of increasing load or torque. In other words, the contact surface between the elastomeric and rigid components of the coupler are shaped to cause an initial contact to occur at a preselected region, such as a protrusion which will be described below. This initial contact creates a relatively small load bearing area at the contact surface. As a result, the stiffness of the coupler during the initial contact is relatively small compared to later increased stiffness when the coupler is under increased load. As additional displacement, or relative rotation between the driving and driven shafts, occurs this contact is increased and permits the elastomeric member to resist the displacement with a higher degree of stiffness.

In FIG. 3B, the idle phase is the range of displacement to the left of line 32. The transition phase, during the transmission of mid-range torque or loads through the coupler, occurs between dashed lines 32 and 34. Between dashed lines 34 and 36, the control phase occurs where relatively little displacement as a function of load occurs. Although the range of displacement in FIG. 3B is divided into three distinct phases, it should be understood that this is not a requirement of all embodiments of the present invention. In fact, many different shapes of elastomeric members and rigid fingers are contemplated within the scope of the present invention that will cause a continuously changing rate of stiffness to occur as the displacement changes from the idle phase to the control phase. In other words, line 38 could be a smooth line that represents a continuously changing stiffness which represents a continuously changing load versus displacement relationship.

As will be described in greater detail below, the characteristic illustrated in FIG. 3B is significantly beneficial because it allows a relatively soft coupling during idle speeds, but provides a much stiffer connection during high speed or high torque operation. The beneficial characteristic represented in FIG. 3B is achieved by creating a contact surface with a particular shape that achieves changing contact areas during conditions of changing load.

Figure 4:
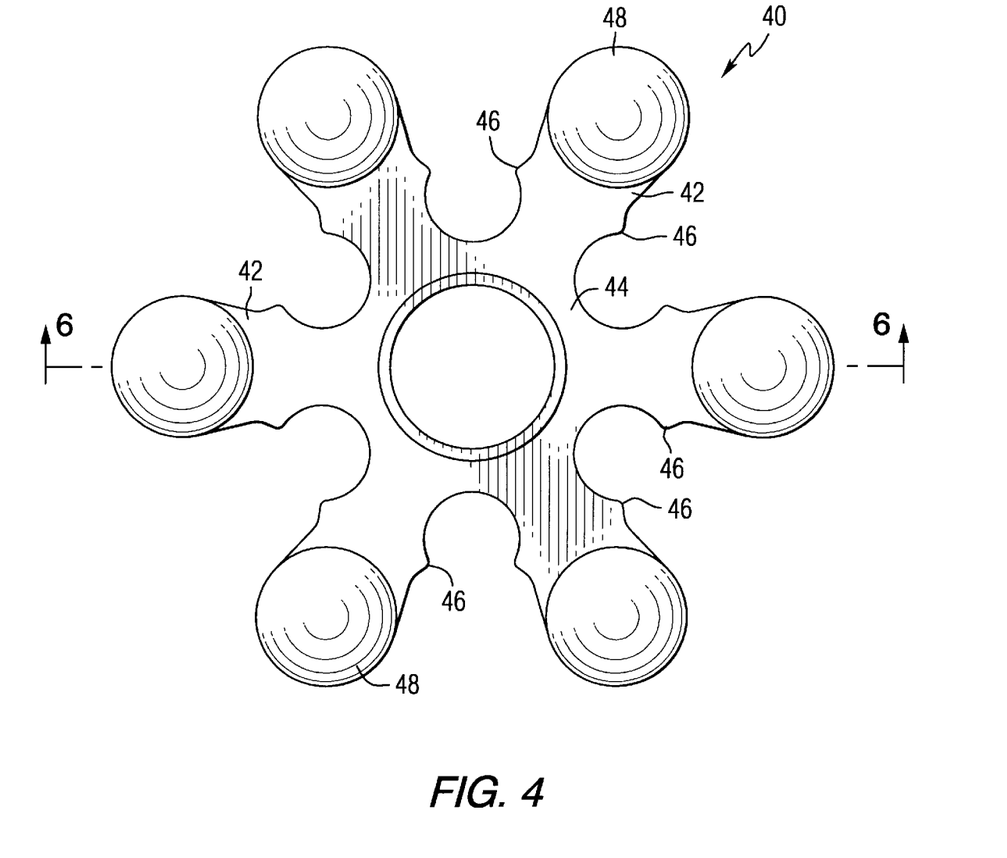
FIG. 4 shows an elastically deformable member used in the preferred embodiment of the present invention.

FIG. 4 illustrates an elastically deformable member 40 used to provide the advantageous characteristics of the present invention. The elastically deformable member 40 comprises a plurality of lobes 42 that extend radially from the central hub 44. As will be described later in conjunction with FIG. 4, each of the lobes 42 is disposed between an associated one of the first plurality of fingers attached for rotation with a first shaft and a preselected one of a second plurality of fingers attached for rotation to a second shaft. Several characteristics of the elastically deformable member 40 are distinctive in comparison to couplers known to those skilled in the art. As can be seen, a protrusion 46 extends from each side of each lobe in a direction that is generally circumfential. A protrusion 46 performs an important function of the present invention by providing initial contact between the contact surface of the lobe 42 and a contact surface of one of the fingers that are arranged interdigitally with respect to the elastically deformably member 40. Another characteristic that can be seen in FIG. 4 is that the distal portion of each of the lobes 42 is shaped in a generally spherical configuration in order to provide a variable rate of stiffness when the elastically deformably member 40 is arranged in a coupler system that is slightly misaligned, either statically or dynamically. The sphere 48 provides a variable contact area that is determined by the amount of misalignment and the compressive force exerted on the spheres 48.

Figure 5:
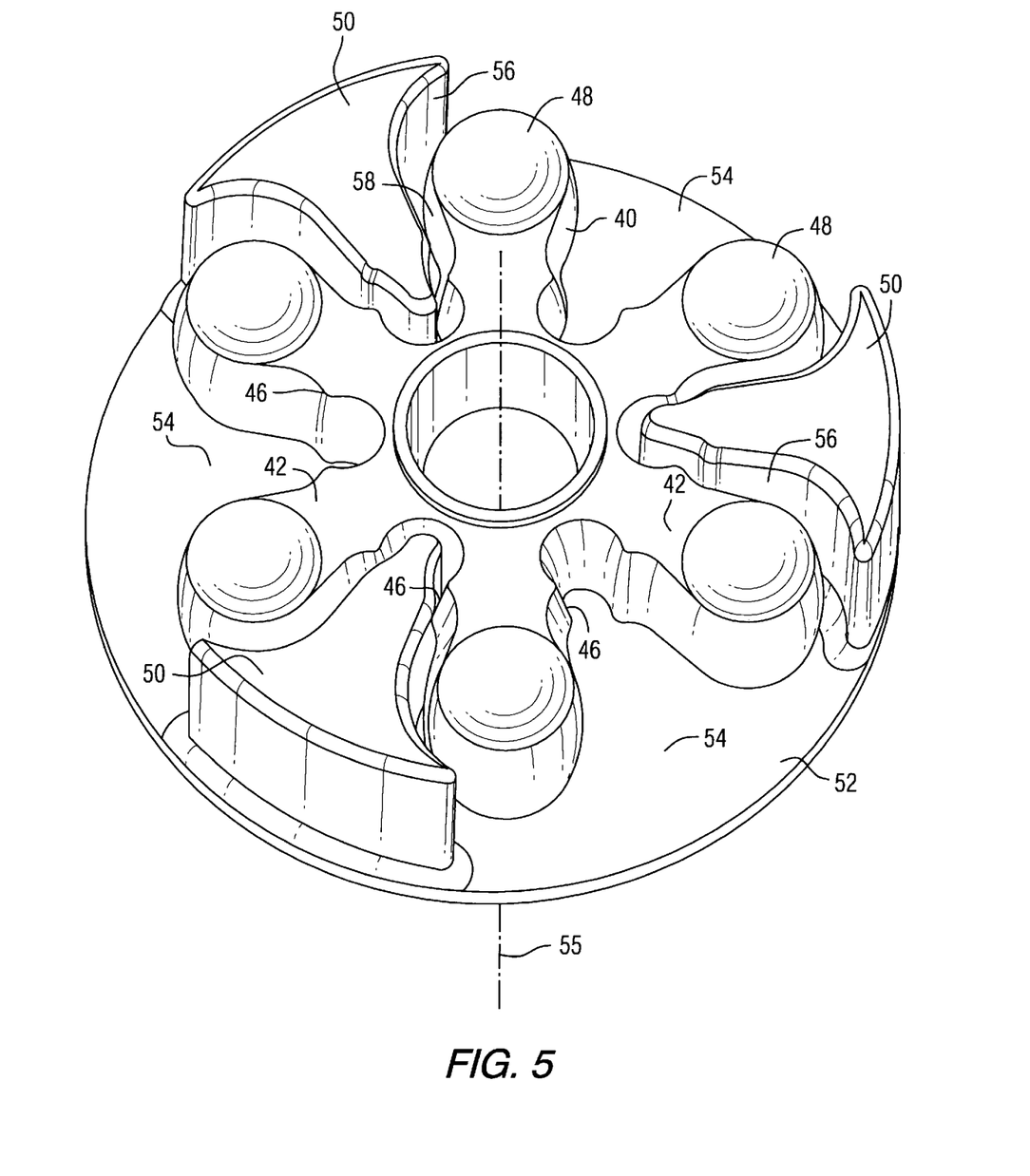
FIG. 5 illustrates the elastically deformable member associated with one set of fingers.

FIG. 5 is a view of an elastically deformable member 40 associated with a first plurality of fingers. Each finger 50 is attached to a plate 52 which, in turn, is attached to a shaft (not shown in FIG. 5) for rotation with the shaft. The fingers 50 extend from the surface of the plate 52 in a direction that is generally parallel with the centerline 55 of the shaft. In the space identified by reference numeral 54, fingers of a second shaft would be disposed between the nearby lobes 42 of the elastically deformable member. These fingers of the second shaft are not illustrated in FIG. 5 for purposes of clarity and to allow the illustrated components to be more visible.

As can be seen in FIG. 5, each distal end of the elastically deformable member 40 is provided with a spherical shape 48. In addition, each of the lobes 42 is provided with two protrusions 46. Each of the fingers has a first contact surface 56 which moves into contact with a second contact surface 58 of an adjacent lobe 42 of the elastically deformable member. When the two sets of fingers are arranged interdigitally with respect to the lobes of the elastically deformable member 40, relative rotation of the first and second shafts will cause selected ones of the lobes 42 to be compressed between adjacent ones of the fingers. In other words, when relative rotation occurs between the driving shaft and the driven shaft, some of the lobes 42 will be compressed between one of the first plurality of fingers and one of the second plurality of fingers. For purposes of this discussion, the contact surface of the fingers are identified as the first contact surface 56 and the contact of the lobes are identified as the second contact surface 58. When torque is transmitted through the coupler, a first contact surface 56 of some of the fingers will move into contact with the second contact surface 58 of preselected ones of the lobes. In an arrangement such as that shown in FIG. 5, alternative lobes will be compressed when relative rotation occurs between the driving and driven shafts in one direction and the other lobes will be compressed when relative rotation occurs in the opposite direction. It is important to note that, as shown in FIG. 5, the first and second contact surfaces are not flat surfaces on both the fingers and the lobes.

It should be understood that the characteristics of the present invention provide significant advantages in several different ways. First, the coupler reacts to axial misalignment. If the two shafts, 12 and 16, are not coaxial, the plates 52 will not be parallel to each other and axial misalignment will occur. The present invention also reacts advantageously when relative rotation occurs between the plates 52 resulting from changes in the magnitude of torque transmitted from the engine to the propulsion device. Misalignments can be both static and dynamic. In other words, the engine and propulsion system can be assembled in such a way that the shafts, 12 and 16, are not coaxial even when the engine is not running. This is static misalignment. Also, when the vehicle is operated, impacts can cause dynamic misalignments which are transient. These could occur as a personal watercraft jumps over waves. These impacts can cause dynamic misalignment.

Figure 6:
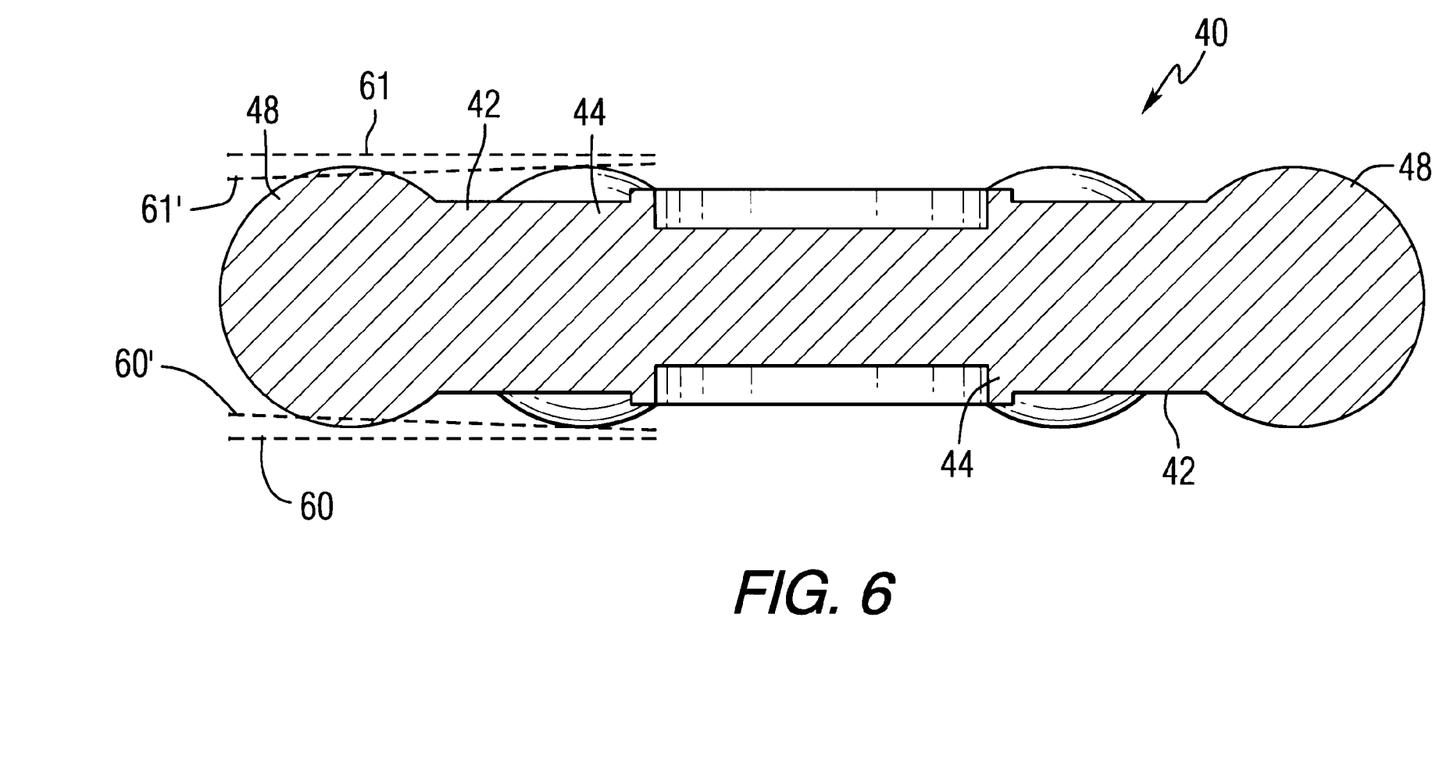
FIG. 6 is a sectional view of the illustration in FIG. 4.

FIG. 6 shows a sectional view of the elastically deformable member 40 illustrated in FIG. 4. The lobes 42 extend from the hub 44 and the distal ends of each of the lobes is spherical 48 in shape. In FIG. 6, two dashed lines, 60 and 61, represent the intended location and position of the surfaces of the plates of two shafts used in conjunction with the coupler of the present invention. Ideally, these two plates, such as plate 52 in FIG. 5, should be parallel with each other and their facing surfaces should remain in a constant displacement from each other and from the lobes 42 of the elastically deformable member 40. If the shafts are not coaxial along a common line, the parallel arrangement of dashed lines 60 and 61 will not occur. This is schematically represented by dashed lines 60' and 61' which show the positions of the faces of the plates 52 if the two shafts, 12 and 16, are misaligned, either statically or dynamically. Rather than remaining in noncontact relation with the elastically deformable member 40, the surfaces of the plates 52 move into contact with the distal ends of the lobes.

When the two shafts are misaligned, the initial resistance to the misalignment is provided by the interaction between the central portions of the plates 52 and the central portion of the elastically deformable member 40. In other words, the initial magnitude of misalignment compresses portions of the central hub of the elastically deformable member and is resisted by the elastomeric material. Further misalignment is reacted to by the spherically shaped distal ends of the lobes. Because of their spherical shape, their compression results in an increased contact area between the plates 52 and the lobes. This, in turn, causes a resistance to compression which increases with increased compression of the lobes. However, it should be understood that the stiffness of the lobes, even when only slightly compressed, is measurably greater than the stiffness of the central portion of the elastomerically member. As a result, the reaction of the coupler to misalignment is initially soft and progressively stiffer, as represented in FIG. 3B. This characteristic of the present invention represents one of its most significant advantages. Whether axially or radially, the multiple rates of stiffness provided by the present invention allow a relatively soft resistance during slight relative motions between the components and a much stiffer resistance in response to greater relative movements.

Figure 7:
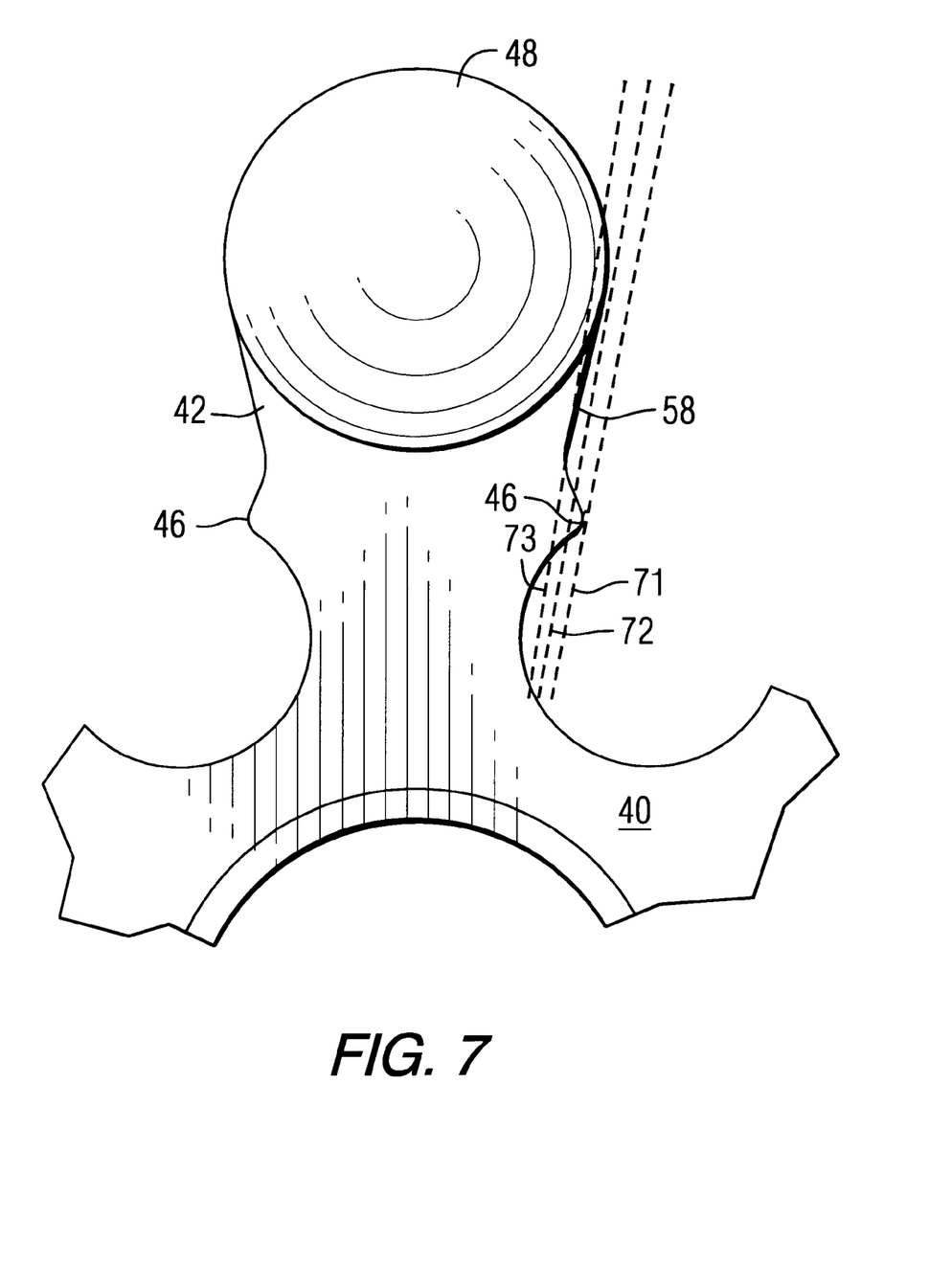
FIG. 7 is a simplified graphical representation describing the principles of the present invention.

FIG. 7 shows a single lobe 42 for purposes of illustrating the manner in which the protrusions 46 facilitate the advantageous characteristics of the present invention. Dashed line 71 schematically represents the position of a first contact surface 56, as described above in conjunction with FIG. 5, when the system is at rest and no relative movement has taken place between the first 56 and second 58 contact surfaces. In a preferred embodiment of the present invention, the first contact surface 56, as represented schematically by dashed line 71, is in slight contact with the second contact surface 58, but little compression of the second contact surface is occurring. As relative rotation begins, the first contact surface 56 moves into more significant contact with the second contact surface 58, as schematically represented by dashed line 72, and the protrusion 46 begins to be compressed. The shapes of the first and second contact surfaces, 56 and 58, cause the area of the contact region to be minimal initially and then expand as further relative rotation of the components occurs. In other words, the tip of the protrusion 46 creates a relatively slight contact area to initially resist the relative motion of the two contact surfaces, 56 and 58. Then, as further relative rotation occurs, the protrusion is deformed and the contact area increases. When the first surface 56 is at the position of dashed line 72, the contact surface at the protrusion 46 is greater that it was when the first surface was at dashed line 71. This results in an increasing resistance to relative rotation and a greater stiffness as a result of the increased relative rotation.

As further relative rotation occurs between the first and second surfaces, 56 and 58, the first surface eventually compresses the protrusion sufficiently to move into contact with the spherical distal end 48 of the lobe 40. This is schematically represented by dashed line 73. The spherical distal end 48 reacts to compression in a similar way to the protrusion, by providing increased resistance to further relative movement. This causes increased stiffness in response to increased relative movement.

Figure 8:
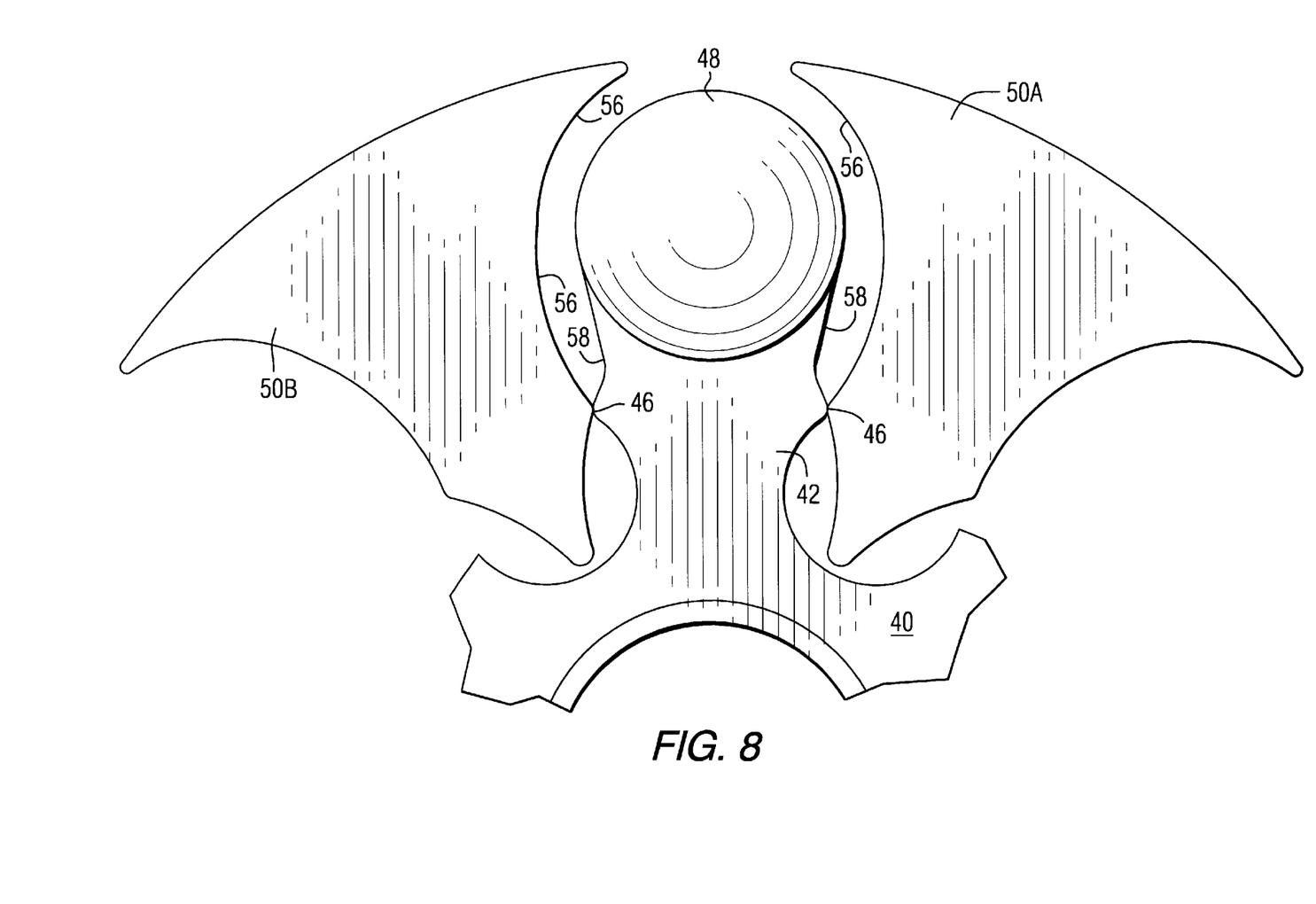
FIG. 8 shows the relative positions of the fingers and lobes of present invention prior to movement of the components in response to relative rotation of a driving and a driven shaft.

FIG. 8 shows the position of the lobe 42 of the elastically deformable member 40 in relation to two fingers, 50A and 50B, between which the lobe is disposed. In FIG. 8, the positions of the fingers 50 in relation to the lobe 42 indicate that the coupler is under relatively no torque and very little relative rotation has occurred between the driving shaft and the driven shaft. The first surfaces 56 of the fingers 50 are in contact with the second contact surfaces 58 of the lobe, but little compression of the elastically deformable member 40 has occurred. Even the protrusions 46 are only in slight contact with the first contact surfaces 56 because of the lack of relative rotational movement between the elastically deformable member 40 and the fingers 50. For purposes of this description, finger 50A is attached to a plate 52 of one of the shafts while finger 50B is attached to a plate of the other shaft. Relative movement between the two shafts will cause the fingers, 50A and 50B, to move either toward each other or away from each other. For purposes of this description, it will be assumed that the relative rotation causes the two fingers shown in FIG. 8 to move toward each other and attempt to compress the lobe 42 which is shown. However, it should be understood that relative rotation in the opposite direction would have the same affect, but on other fingers of the elastically deformable member.

If relative rotation occurs, the initial contact between the first surfaces 56 and the second surfaces 58 will occur at the region defined by the protrusion 46 which extends in a generally circumfential direction from the lobe 42 toward the finger. This initial compressive contact between the first and second contact surfaces, as described above in conjunction with reference numeral 72 in FIG. 7, will be generally soft because of the very small cross sectional area that will initially be available at the protrusion 46 to resist the compression of the lobe. As further relative movement of the fingers occur toward each other, the compression of the protrusion 46 will then cause a greater cross sectional area to be available to more effectively resist further relative movement. Eventually, the protrusion 46 will be fully deformed and the spherical distal end 48 will be compressed as a result of further relative movement of the fingers. This will continue to occur until a relatively significant percentage of the areas of the first and second contact surfaces are moved into contact with each other. Eventually, the entire surface area of the first and second contact areas, 56 and 58, will be in contact with each other and the stiffness of the lobe will reach its maximum. It should be appreciated that this achievement of maximum stiffness will occur in a variable manner, with the initial contact resulting in a relatively soft resistance and subsequent contact resulting in a much stiffer resistance.

Figure 9:
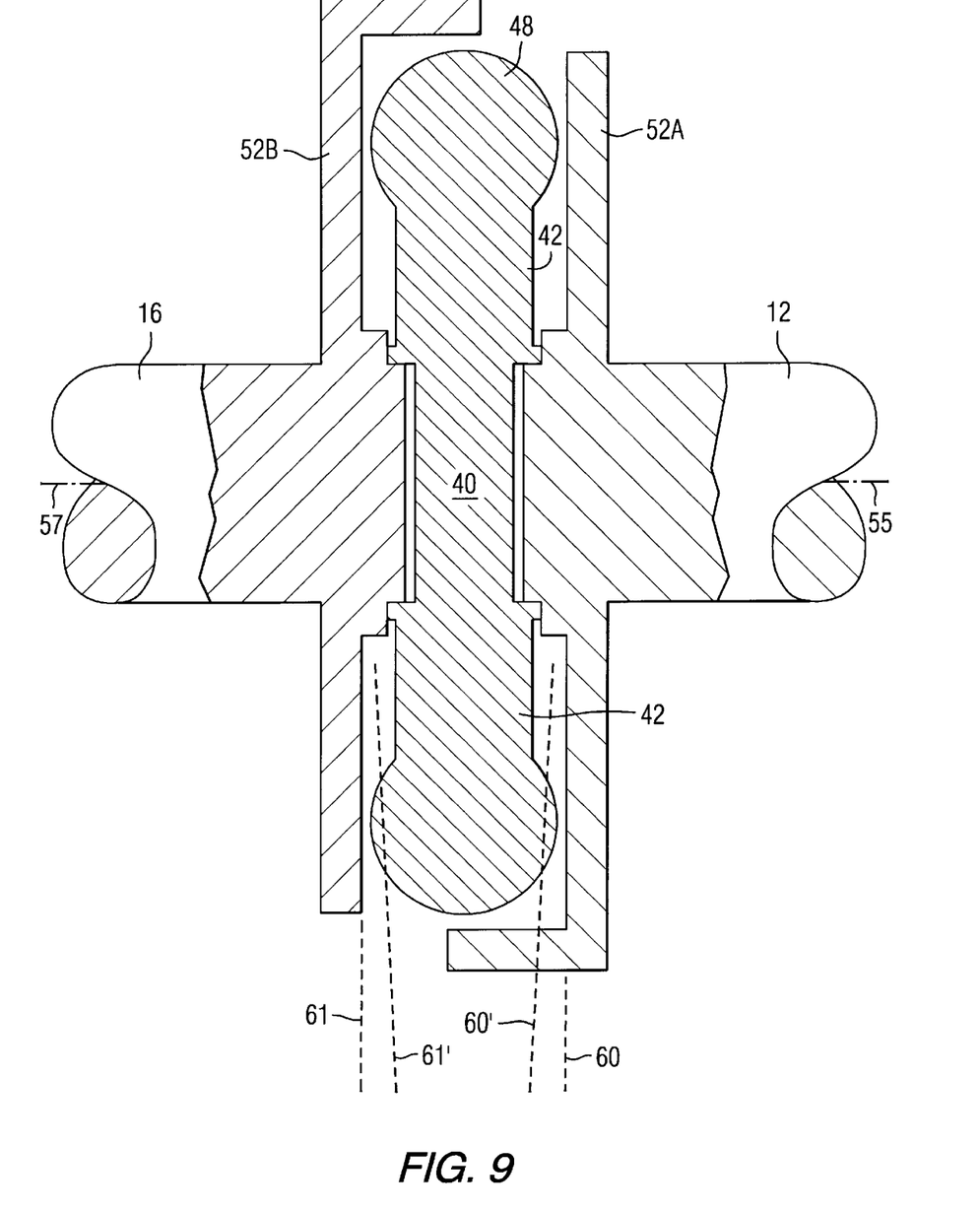
FIG. 9 is a section view of a coupler system made in accordance with the present invention.

FIG. 9 shows an assembly view of a coupler system made in accordance with the present invention. The driving shaft 12 is attached to a plate 52A and the driven shaft 16 is attached to a plate 52B. For purposes of the illustration in FIG. 9, the individual fingers 50 extending from the plates are not illustrated. FIG. 9 is provided to describe the reaction of the spherical portions 48 in response to axial misalignment of the shafts, either statically or dynamically. The driving shaft 12 rotates about a centerline 55 and the driven shaft 16 rotates about a centerline 57. If the two centerlines are coaxial, the two plates, 52A and 52B, will be arranged in a general parallel configuration as described above in conjunction with FIG. 6 in conjunction with the discussion of dashed lines 60 and 61. In other words, dashed line 60 represents the surface of plate 52A and dashed line 61 represents the surface of plate 52B when the centerlines, 55 and 57, and coaxial and the plates, 52A and 52B, are parallel. These two surfaces are parallel to each other because the centerlines, 55 and 57, are coaxial. This situation places very little, if any, compressive force on the spherical portions 48 of the elastically deformable member 40. If, however, the two centerlines, 55 and 57, of the driving and driven shafts are not coaxial, the spherical portions 48 of the lobes 42 will experience compression at certain positions of the rotation of the shafts. In other words, the spherical end 48 of the lobe may be compressed more during certain portions of the rotation than during others and the magnitude of compression of any particular lobe may vary in a manner which will tend to be cyclic and generally sinusoidal.

The misalignment will cause a resistance by the spherical portions which is generally a function of the magnitude of the area of the contact surfaces which are in contact with each other. The initial slight degree of misalignment will cause a relatively small contact area to resist misalignment. This would result in a relatively small reaction by the elastically deformable member and the reaction will be soft. As increasing misalignment causes a higher magnitude of area of spherical portion to be in contact with the plate 52, the resistance will increase. As a result, the spherical portion of the lobes will respond to different magnitudes of misalignment with varying degrees of stiffness.

In both examples, relating to axial misalignment and relative rotational movement, the present example provides its primary advantage by resisting relative motion with a stiffness that changes as a function of the magnitude of relative movement. Increasing relative movement causes increasing contact surface and increasing contact surface results in increased stiffness which resists further relative movement. The coupler of the present invention effectively decouples an engine, or other motive source, from the propulsion system. This decoupling allows the engine to be isolated from the system. The isolation of the engine from the propulsion system reduces noise and vibration.

As described above, the present invention provides an elastically deformable member which reacts with a variable rate of stiffness to both the relative rotation of the two shafts and misalignment of the two shafts. In both cases, a slight degree of relative movement will cause a soft reaction by the elastically deformable member. Increased relative movement of the opposing surfaces will be reacted by the elastically deformable member with increasing stiffness. As a result, the advantageous softness of the coupler at relatively low speeds or relatively small degrees of misalignment will be responded to with a soft reaction, but higher degrees of relative rotation of the shafts or higher degrees of misalignment of the shafts will be responded to with a higher stiffness.

The present invention has been described with considerable detail and illustrated with particular specificity to show a preferred embodiment of the present invention. However, it should be appreciated that the principles of the present invention can be used in many other ways that are also within the scope of the present invention.

I claim:

1. A coupling assembly, comprising:

a first shaft and a second shaft;

a first plurality of fingers attached for rotation with said first shaft and extending from said first shaft in a direction that is generally parallel to a first centerline of said first shaft;

a second plurality of fingers attached for rotation with said second shaft and extending from said second shaft in a direction that is generally parallel to a second centerline of said second shaft, said first plurality of fingers being interdigitated with said second plurality of fingers;

an elastically deformable member comprising a plurality of lobes extending radially from a central hub, each of said plurality of lobes being disposed between an associated one of said first plurality of fingers and an associated one of said second plurality of fingers, wherein relative movement of said first and second shafts moves a first contact surface of a predetermined one of said first plurality of fingers into compressive contact with a second contact surface of a predetermined one of said plurality of lobes, said first and second contact surfaces being shaped to cause an initial contact to occur between said first and second contact surfaces at a first region of said second contact surface in response to a first magnitude of said relative movement of said first and second shafts, said first and second contact surfaces being shaped to cause a subsequent contact to occur between said first and second contact surfaces at a second region of said second contact surface in response to a second magnitude of said relative movement of said first and second shafts, the resistance of said predetermined one of said plurality of lobes to said relative movement of said first and second shafts being greater during said subsequent contact than during said initial contact, each of said first plurality of fingers being attached to a first plate which is attached to said first shaft, each of said second plurality of fingers being attached to a second plate which is attached to said second shaft; and a distal portion of each of said plurality of lobes which is thicker in a direction parallel with said first and second centerlines than the more radially inward portions of each of said plurality of lobes, said distal portion providing a reaction to being compressed between said first and second plates with a stiffness that varies directly with the degree of misalignment between said first and second shafts.

2. The coupling assembly of claim 1, wherein:

said relative movement of said first and second shafts is a relative rotation between said first and second shafts.

3. The coupling of claim 1, wherein:

said relative movement of said first and second shafts is an axial movement resulting in a misalignment between the central axes of said first and second shafts.

4. The coupling assembly of claim 1, wherein:

said distal portion of each of said plurality of lobes is generally spherical.

5. The coupling of claim 4, wherein:

said second shaft is connected for torque transmission with a propeller shaft of a marine propulsion system.

6. The coupling of claim 5, wherein:

said marine propulsion system is an outboard motor.

7. The coupling of claim 5, wherein:

said marine propulsion system is a stern drive device.

8. The coupling of claim 1, wherein:

said second contact surface has a protrusion extending from it in a generally circumferential direction to contact said first contact surface before any other portion of said second contact surface in response to said relative movement of said first and second shafts.

9. The coupling of claim 1, wherein:

said first shaft is a drive shaft of an internal combustion engine.

10. The coupling of claim 1, wherein:

said elastically deformable member is made of a synthetic elastomer.

11. A coupling assembly, comprising:

a first shaft and a second shaft;

a first plurality of fingers attached for rotation with said first shaft and extending from said first shaft in a direction that is generally parallel to a first centerline of said first shaft; a second plurality of fingers attached for rotation with said second shaft and extending from said second shaft in a direction that is generally parallel to a second centerline of said second shaft, said first plurality of fingers being interdigitated with said second plurality of fingers; an elastically deformable member comprising a plurality of lobes extending radially from a central hub, each of said plurality of lobes being disposed between an associated one of said first plurality of fingers and an associated one of said second plurality of fingers, wherein relative rotation of said first and second shafts moves a first contact surface of a predetermined one of said plurality of fingers into compressive contact with a second contact surface of a predetermined one of said plurality of lobes, said first and second contact surfaces being shaped to cause an initial contact to occur between said first and second contact surfaces at a first region of said second contact surface in response to a first magnitude of said relative rotation of said first and second shafts, said first and second contact surfaces being shaped to cause a subsequent contact to occur between said first and second contact surfaces at a second region of said second contact surface in response to a second magnitude of said relative rotation of said first and second shafts, the resistance of said predetermined one of said plurality of lobes to said relative rotation of said first and second shafts being greater during said subsequent contact than during said initial contact, each of said first plurality of fingers being attached to a first plate which is attached to said first shaft and each of said second plurality of fingers being attached to a second plate which is attached to said second shaft, said second contact surface having a protrusion extending from it in a generally circumferential direction to contact said first contact surface before any other portion of said second contact surface in response to said relative rotation of said first and second shafts; and a distal portion of each of said plurality of lobes which is thicker in a direction parallel with said first and second centerlines than the more radially inward portions of each of said plurality of lobes, said distal portion providing a reaction to being compressed between said first and second plates with a stiffness that varies directly with the degree of misalignment between said first and second shafts.

12. The coupling assembly of claim 11, wherein:

said distal portion of each of said plurality of lobes is generally spherical.

13. The coupling of claim 12, wherein:

said first shaft is a drive shaft of an internal combustion engine.

14. The coupling of claim 13, wherein:

said second shaft is connected for torque transmission with a propeller shaft of a marine propulsion system.

15. The coupling of claim 14, wherein:

said marine propulsion system is an outboard motor.

16. A coupling assembly, comprising:

a first shaft and a second shaft;

a first plurality of fingers attached for rotation with said first shaft and extending from said first shaft in a direction that is generally parallel to a first centerline of said first shaft;

a second plurality of fingers attached for rotation with said second shaft and extending from said second shaft in a direction that is generally parallel to a second centerline of said second shaft, said first plurality of fingers being interdigitated with said second plurality of fingers;

an elastically deformable member comprising a plurality of lobes extending radially from a central hub, each of said plurality of lobes being disposed between an associated one of said first plurality of fingers and an associated one of said second plurality of fingers, wherein relative rotation of said first and second shafts moves a first contact surface of a predetermined one of said plurality of fingers into compressive contact with a second contact surface of a predetermined one of said plurality of lobes, said first and second contact surfaces being shaped to cause an initial contact to occur between said first and second contact surfaces at a first region of said second contact surface in response to a first magnitude of said relative rotation of said first and second shafts, said first and second contact surfaces being shaped to cause a subsequent contact to occur between said first and second contact surfaces at a second region of said second contact surface in response to a second magnitude of said relative rotation of said first and second shafts, the resistance of said predetermined one of said plurality of lobes to said relative rotation of said first and second shafts being greater during said subsequent contact than during said initial contact, each of said first plurality of fingers being attached to a first plate which is attached to said first shaft and each of said second plurality of fingers being attached to a second plate which is attached to said second shaft, said second contact surface having a protrusion extending from it in a generally circumferential direction to contact said first contact surface before any other portion of said second contact surface in response to said relative rotation of said first and second shafts; and a distal portion of each of said plurality of lobes which is thicker in a direction parallel with said first and second centerlines than the more radially inward portions of each of said plurality of lobes, said distal portion providing a reaction to being compressed between said first and second plates with a stiffness that varies directly with the degree of misalignment between said first and second shafts, said distal portion of each of said plurality of lobes being generally spherical, said first shaft being a drive shaft of an internal combustion engine, said second shaft is connected for torque transmission with a propeller shaft of a marine propulsion system.

17. The coupling of claim 16, wherein:

said elastically deformable member is made of a synthetic elastomer.

* * * * *